United States Patent Office 2,798,090
Patented July 2, 1957

2,798,090

PROCESS FOR PREPARING BENZALANILINE-3-SULFONIC ACID COMPOUNDS

Max W. Krell and Flaven E. Johnson, Kingsport, Tenn., assignors to Eastman Kodak Company, Rochester, N. Y., a corporation of New Jersey No Drawing. Application March 2, 1953, Serial No. 339,923

12 Claims. (Cl. 260—509)

This invention relates to an improved process for preparing benzalaniline-3-sulfonic acid compounds which in their free acid form have the formula:

(I) 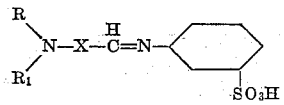

wherein X stands for a monocyclic aryl nucleus of the benzene series and R and $R_1$ each represents an alkyl group, a hydroxyalkyl group or an alkoxyalkyl group and wherein the group

stands in para position to the

—$\overset{H}{C}$=N grouping grouping.

It is an object of this invention to provide an improved process for preparing benzalaniline-3-sulfonic acid compounds having the formula above given, whereby these compounds are efficiently and economically prepared in good yield. A particular object is to provide a new and improved process for preparing said benzalaniline-3-sulfonic acid compounds using nitrobenzene as a starting compound.

4'-(ethyl,β-hydroxyethyl)aminobenzalaniline-3-sulfonic acid, 4'-(butyl, β-hydroxyethyl)aminobenzalaniline-3-sulfonic acid and 4'-(butyl, β-hydroxyethyl)amino-2'-methylbenzalaniline-3-sulfonic acid have been prepared by reacting N-ethyl-N-β-hydroxyethylaniline, N-butyl-N-β-hydroxyethylaniline and N-butyl-N-β-hydroxyethyl-m-toluidine, respectively, with formaldehyde and sodium meta-nitrobenzene sulfonate in the presence of hydrochloric acid and iron. Dippy, Hogarth, Watson and Williams, J. Soc. Chem. Ind., vol. 56, pages 346T-348T (1937).

We have discovered that the benzalaniline-3-sulfonic acid compounds having the formula numbered I can be prepared by reacting aniline compounds having the formula:

(II) 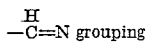

wherein X, R and $R_1$ have the meaning previously assigned to them with formaldehyde and meta-nitrobenzene sulfonic acid in the presence of sulfuric acid and iron. The aniline compound is not substituted in the para position to the amino group. The use of sulfuric acid in place of hydrochloric acid gives much better yields and results in much lower costs for producing these products. Additionally, the use of sulfuric acid rather than hydrochloric acid considerably reduces the problem of corrosion.

A particular feature of our invention is that nitrobenzene can be sulfonated to meta-nitrobenzene sulfonic acid and the meta-nitrobenzene sulfonic acid thus formed is used without isolation from its reaction mixture in the preparation of the benzalaniline-3-sulfonic acid compounds. This is a big improvement over the hydrochloric acid process wherein meta-nitrobenzene sulfonic acid is formed by sulfonating nitrobenzene with sulfuric acid, isolated from its reaction mixture, and then reacted with formaldehyde and an aniline compound in the presence of hydrochloric acid in that the meta-nitrobenzene sulfonic acid does not have to be separately recovered and the sulfuric acid present in the sulfonation operation supplies the sulfuric acid used in the reaction between the aniline compound, formaldehyde and meta-nitrobenzene sulfonic acid. Additionally, the advantages above enumerated with respect to better yields, lower costs and reduced corrosion are also obtained.

The reaction between the aniline compound, formaldehyde and meta-nitrobenzene sulfonic acid in the presence of sulfuric acid and iron is preferably carried out at a temperature of from 5° C. to 35° C. A temperature of from about 16° C. to about 20° C. appears to be especially advantageous. Similarly, the iron is preferably added as fast as foaming and temperature control will permit and preferably should not take over 3 hours. Following the conditions just set forth, product yields of 80% or more are normally obtained. The reaction has been carried out at temperatures as low as 0° C. and as high as 50° C. with the addition of iron taking up to 8 hours but conditions falling outside the preferred range ordinarily give much inferior results to those obtained when the prefered conditions are employed.

The aryl nucleus X may be substituted by substituents such as, for example, the methyl group, the ethyl group, a methoxy group, an ethoxy group, a chlorine atom or a bromine atom. Illustrative of the alkyl groups represented by R and $R_1$ are the methyl, the ethyl, the n-propyl, the isopropyl and the n-butyl groups. Illustrative of the hydroxyalkyl groups represented by R and $R_1$ are the β-hydroxyethyl group, the β-hydroxypropyl group, the γ-hydroxypropyl group, the β,γ-dihydroxypropyl group and the δ-hydroxybutyl group. Similarly, the β-methoxyethyl and the β-ethoxyethyl groups are illustrative of the alkoxyalkyl groups R and $R_1$ represent.

Illustrative of the aniline compounds having the formula numbered II are N,N-di-β-hydroxyethylaniline, N,N-di-β-hydroxyethyl-m-toluidine, N,N - di - β-hydroxyethyl - m - ethylaniline, N-ethyl-N-β-hydroxyethylaniline, N,N - dimethylaniline, N,N - diethylaniline, N,N - di - n-propylaniline, N,N-di-n-butylaniline, N,N-di-β-methoxyethylaniline, N,N-di-β-ethoxyethylaniline, N,N-di-β-hydroxyethyl-m-chloroaniline, N,N - di - β-hydroxyethyl-m-methoxyaniline, N-ethyl-N-β-hydroxyethyl-m-toluidine, N-β-hydroxyethyl-N-β-ethoxyethylaniline, N-n-butyl-N-β-hydroxyethylaniline, N-ethyl-N-γ-hydroxypropylaniline, N-ethyl-N-δ-hydroxybutylaniline, N-ethyl - N - β,γ-dihydroxypropylaniline, N-n-propyl-N-β,γ-dihydroxypropyl-m-toluidine, N,N-di-β,γ-dihydroxypropyl-m-toluidine, N-methyl-N-β-hydroxyethyl-m-toluidine, N,N-di-β-hydroxyethyl-m-bromoaniline, N,N-di-γ-hydroxypropyl-m-bromoaniline and N,N-di-δ-hydroxybutyl-m-chloroaniline.

The following examples, in which parts are expressed as parts by weight, illustrate the process of our invention.

*Example 1*

123 parts of nitrobenzene were slowly added with good agitation to 460 parts of 20% oleum at 50° C. By the time addition of the nitrobenzene was complete the temperature of the reaction mixture had risen to 75° C.–80° C. Following the addition of the nitrobenzene the reaction mixture was heated very slowly to 95° C. and maintained at 95° C. for two hours after which it was allowed to cool to room temperature.

214 parts of the meta-nitrobenzene sulfonic acid reaction mixture prepared as described above were added to 545 parts of water and then 49 parts of N,N-di-β-hydroxyethyl-m-toluidine were dissolved in the resulting mixture. The reaction mixture thus obtained was cooled to 20° C. and 27 parts of 36% aqueous formaldehyde were added thereto. 56 parts of iron filings were then added to the reaction mixture during approximately two hours while maintaining the temperature between 16° C. and 20° C. After the iron addition was complete, the reaction mixture was stirred for four hours at 16° C.–20° C. and then filtered after decanting the reaction mixture from any unreacted iron. 4'-(di-β-hydroxyethylamino)-2'-methylbenzalaniline-3-sulfonic acid having the formula:

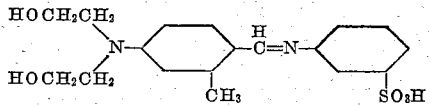

was recovered as an orange solid, washed well with water and dried. 85.5 parts (90% yield) of dried product were obtained.

*Example 2*

By use of 45 parts of N,N-di-β-hydroxyethylaniline in place of N,N-di-β-hydroxyethyl-m-toluidine in Example 1, 81 parts (89% yield) of 4'-(di-β-hydroxyethylamino)-benzalaniline-3-sulfonic acid were obtained.

*Example 3*

Example 1 was repeated using 41 parts of N-ethyl-N-β-hydroxyethylaniline in place of N,N-di-β-hydroxyethyl-m-toluidine. About 70 parts (80% yield) of 4'-(ethyl, β-hydroxyethyl)aminobenzalaniline-3-sulfonic acid were obtained.

*Example 4*

31 parts of concentrated sulfuric acid were added to 374 parts of water and 49 parts of N,N-di-β-hydroxyethyl-m-toluidine were dissolved in the resulting mixture. The solution thus obtained was cooled to 15° C. and 27 parts of 36% aqueous formaldehyde were added. 247 parts of dilute sulfuric acid were then added, the dilute acid consisting of 169 parts of water and 78 parts of concentrated sulfuric acid. Next, 87.5 parts of sodium m-nitrobenzenesulfonate trihydrate were added and then 56 parts of iron filings were added over a period of approximately 2½ hours while maintaining the temperature of the reaction mixture at 16° C.–20° C. After completion of the iron addition, 75 parts of concentrated sulfuric acid were added over a period of 2½ hours while still maintaining the temperature of the reaction mixture at 16° C.–20° C. After completion of the acid addition, the reaction mixture was stirred for two hours at a temperature of 16° C.–20° C., following which it was decanted to separate it from unreacted iron and filtered. The product, 4'-(di-β-hydroxyethylamino)-2'-methylbenzalaniline-3-sulfonic acid, was recovered on the filter as an orange solid. It was washed several times with cold water and dried. 76 parts (80% yield) of dried product were obtained.

*Example 5*

214 parts of m-nitrobenzene sulfonic acid-sulfuric acid prepared as described in Example 1 were added to 545 parts of water and then 54 parts of N,N-di-β-hydroxyethyl-m-chloroaniline were dissolved in the resulting mixture. The reaction mixture thus obtained was cooled to 20° C. and 27 parts of 36% aqueous formaldehyde were added thereto. 56 parts of iron filings were added to the reaction mixture over a period of approximately two hours while maintaining the temperature between 16° C. and 20° C. After the iron addition was complete, the reaction mixture was stirred for four hours at 16° C.–20° C. and then filtered after decanting the reaction mixture from any unreacted iron. The product, 4'-(di-β-hydroxyethylamino)-2'-chlorobenzalaniline-3-sulfonic acid was recovered on the filter as an orange solid. It was washed well with water and dried. 77 parts (80% yield) of dried product were obtained.

The benzalaniline-3-sulfonic acid compounds set forth in the tabulation given hereinafter are likewise readily prepared in accordance with the process of our invention using the procedure described hereinbefore. In each case the benzalaniline-3-sulfonic acid compound and the aniline compound from which it is prepared is given.

| Benzalaniline-3-Sulfonic Acid Compound | Aniline Compound |
|---|---|
| 6. 4'-(di-β-hydroxyethylamino)-2'-methoxybenzalaniline-3-sulfonic acid. | N,N-di-β-hydroxyethyl-m-methoxyaniline. |
| 7. 4'-(di-β-hydroxyethylamino)-2'-ethoxybenzalaniline-3-sulfonic acid. | N,N-di-β-hydroxyethyl-m-ethoxyaniline. |
| 8. 4'-(di-β-hydroxyethylamino)-2'-ethylbenzalaniline-3-sulfonic acid. | N,N-di-β-hydroxyethyl-m-ethylaniline. |
| 9. 4'-(dimethylamino) benzalaniline-3-sulfonic acid. | N,N-dimethylaniline. |
| 10. 4'-(dimethylamino)-2'-methylbenzal-aniline-3-sulfonic acid. | N,N-dimethylamino-m-toluidine. |
| 11. 4'-(diethylamino)-2'-methylbenzal-aniline-3-sulfonic acid. | N,N-diethylamino-m-toluidine. |
| 12. 4'-(di-n-propylamino) benzalaniline-3-sulfonic acid. | N,N-di-n-propylaniline. |
| 13. 4'-(di-n-butylamino) benzalaniline-3-sulfonic acid. | N,N-di-n-butylaniline. |
| 14. 4'-(di-β-methoxyethylamino)-2'-methylbenzalaniline-3-sulfonic acid. | N,N-di-β-methoxyethyl-m-toluidine. |
| 15. 4'-(di-β-ethoxyethylamino) benzal-aniline-3-sulfonic acid. | N,N-di-β-ethoxyethyl-aniline. |
| 16. 4'-(ethyl, β-hydroxyethyl) amino-benzalaniline-3-sulfonic acid. | N-ethyl-N-β-hydroxyethylaniline. |
| 17. 4'-(n-propyl, β-hydroxyethyl) am-inobenzalaniline-3-sulfonic acid. | N-n-propyl-N-β-hydroxyethylaniline. |
| 18. 4'-(n-butyl, β-hydroxyethyl) am-ino-benzalaniline-3-sulfonic acid. | N-n-butyl-N-β-hydroxyethylaniline. |
| 19. 4'-(ethyl, γ-hydroxypropyl) amino-benzalaniline-3-sulfonic acid. | N-ethyl-N-γ-hydroxypropylaniline. |
| 20. 4'-(ethyl, δ-hydroxybutyl) amino-benzalaniline-3-sulfonic acid. | N-ethyl-N-δ-hydroxybutylaniline. |
| 21. 4'-(methyl, β-hydroxyethyl) amino-2'-methylbenzalaniline-3-sulfonic acid. | N-methyl-N-β-hydroxyethyl-m-toluidine. |
| 22. 4'-(di-β-hydroxyethylamino)-2'-bromobenzalaniline-3-sulfonic acid. | N,N-di-β-hydroxyethyl-m-bromoaniline. |
| 23. 4'-(di-γ-hydroxypropylamino)-2'-bromobenzalaniline-3-sulfonic acid. | N,N-di-γ-hydroxypropyl-m-bromoaniline. |
| 24. 4'-(di-δ-hydroxybutylamino)-2'-chlorobenzalaniline-3-sulfonic acid. | N,N-di-δ-hydroxybutyl-m-chloroaniline. |
| 25. 4'-(ethyl,β,γ-dihydroxypropyl) am-ino-2'-methylbenzalaniline-3-sulfonic acid. | N-ethyl-N-β,γ-dihydroxypropyl-m-toluidine. |
| 26. 4'-(ethyl,β,γ-dihydroxypropyl) am-ino-benzalaniline-3-sulfonic acid. | N-ethyl-N-β,γ-dihydroxypropylaniline. |
| 27. 4'-(di-β,γ-dihydroxypropylamino)-2'-methylbenzalaniline-3-sulfonic acid. | N,N-di-β,γ-dihydroxypropyl-m-toluidine. |
| 28. 4'-(n-butyl,β,γ-dihydroxypropyl)-amino-2'-methylbenzalaniline-3-sulfonic acid. | N-n-butyl-N-β,γ-dihydroxypropyl-m-toluidine. |
| 29. 4'-(n-butyl, β-hydroxyethyl) am-ino-2'-methylbenzalaniline-3-sulfonic acid. | N-n-butyl-N-β-hydroxyethyl-m-toluidine. |

The benzalaniline-3-sulfonic acid compounds prepared in accordance with the process of our invention are not broadly new. They are useful, for example, in the preparation of methine compounds, such as those described in U. S. Patents 2,583,551 and 2,583,614, issued January 29, 1952, which are valuable dyes for cellulose acetate textile materials. Thus, following the procedure described in U. S. Patents 2,583,551 and 2,583,614 the benzalaniline-3-sulfonic acid compounds are useful, for example, in the preparation of methine compounds having the formula:

(III)
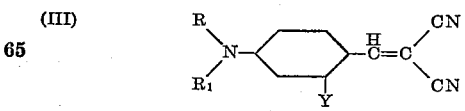

or the formula:

(IV)
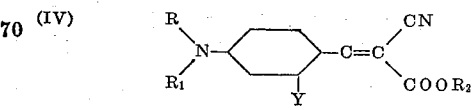

R and R₁ have the meaning previously assigned to them, R₂ represents an alkyl group having one to four, inclusive, carbon atoms, a β-methoxyethyl group or a β-ethoxyethyl group and Y represents a methyl group, an ethyl group, a methoxy group, an ethoxy group, a chlorine atom or a bromine atom. These compounds are dyes for cellulose acetate textile materials.

While the prior art teaches that when 4'-substituted aminobenzalaniline-3-sulfonic acid compounds are used to prepare methine dyes the reaction should be carried out in an organic solvent such as 50% aqueous methyl alcohol, we have discovered that the reaction can be carried out using water as the reaction medium. The use of water is advantageous in that it eliminates a solvent recovery operation and involves the use of a non-flammable inert diluent rather than a flammable inert diluent.

In accordance with our discovery methine compounds having the formula:

(V) 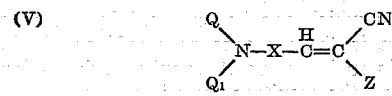

wherein Q represents a hydrogen atom, an alkyl group, a hydroxyalkyl group or an alkoxyalkyl group, $Q_1$ represents an alkyl group, a hydroxyalkyl group or an alkoxyalkyl group, X represents a monocyclic aryl nucleus of the benzene series and Z represents a cyano group or a —COOR$_2$ group, wherein R$_2$ represents an alkyl group having one to four, inclusive, carbon atoms, a β-methoxyethyl group or a β-ethoxyethyl group and wherein the

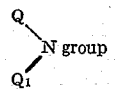

stands in para position to the

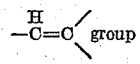

are prepared by reacting a benzalaniline-3-sulfonic acid having the formula:

(VI) 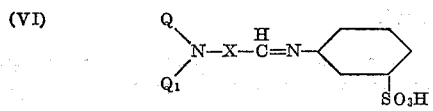

wherein Q, $Q_1$ and X have the meaning previously assigned to them and the

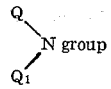

stands in para position to the

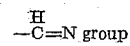

with malononitrile, an alkyl cyanoacetate or an alkoxyalkyl cyanoacetate in water in the presence of an acid binding agent. The reaction can be carried out at a temperature of from about 0° C. to about 100° C. However, a temperature of from about 20° C. to about 50° C. appears to give the best results and is preferred.

Acid binding agents that can be used include, for example, sodium bicarbonate, sodium carbonate, potassium bicarbonate and potassium carbonate. Slightly improved yields and a smoother reaction mixture result when a wetting agent is employed in the reaction although good yields have been obtained when none was used. Only a small amount of wetting agent need be used to obtain the benefits just mentioned. While all wetting agents have not been tried, it appears that any wetting agent whether anionic, nonionic or cationic can be used. Duponal, a long chain aliphatic alcohol sulfate, is representative of the anionic wetting agents that can be used while Triton X–100 which is made by condensing an alkyl phenol with ethylene oxide is representative of the nonionic wetting agents.

The following examples in which parts are expressed as parts by weight illustrate the manner in which the benzalaniline-3-sulfonic acid compounds prepared in accordance with the process of our invention are used to prepare methine compounds.

*Example 30*

378 parts of 4'-(di-β-hydroxyethylamino)-2'-methylbenzalaniline-3-sulfonic acid were placed in 3200 parts of water and 92 parts of sodium bicarbonate were added thereto. The reaction mixture resulting was heated slowly to 60° C. and stirred until solution was complete. 120 parts of methylcyanoacetate were then added after adding two parts of a wetting agent. The reaction mixture thus obtained was stirred for 16 hours without heating and the product which forms was recovered on the filter by filtration. The yellow crystalline product collected on the filter was washed well with cold water and then dried. 252 parts (82.9% of theory) of 4-(di-β-hydroxyethylamino) - 2 - methylbenzylidenemethylcyanoacetate having the formula:

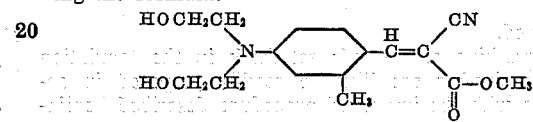

were thus obtained. It melts at 148° C.–150° C.

*Example 31*

By the use of 364 parts of 4'-(di-β-hydroxyethylamino)-benzalaniline-3-sulfonic acid in place of 4'-(di-β-hydroxyethylamino)-2'-methylbenzalaniline-3-sulfonic acid in Example 30, 225 parts (77.6% of theory) of 4-(di-β-hydroxyethylamino)-benzylidenemethylcyanoacetate melting at 133° C.–135° C. were obtained.

*Example 32*

This reaction was carried out in the same manner as that described in Example 30 except that 348 parts of 4'-(ethyl, β - hydroxyethyl)aminobenzalaniline-3-sulfonic acid were used in place of 4'-(di-β-hydroxyethylamino)-2'-methylbenzalaniline-3-sulfonic acid. The dye compound obtained separates as an oil which solidifies upon standing. 164 parts (60% of theory) of 4-(ethyl, β-hydroxyethyl)aminobenzylidenemethylcyanoacetate melting at 76° C.–78° C. were obtained.

*Example 33*

378 parts of 4'-(di-β-hydroxyethylamino)-2'-methylbenzalaniline-3-sulfonic acid were placed in 3200 parts of water and 92 parts of sodium bicarbonate were added. The reaction mixture thus obtained was heated slowly to 60° C. and stirred until solution was complete. 73 parts of malononitrile were then added to the reaction mixture after adding two parts of a wetting agent. The reaction mixture thus obtained was stirred for 16 hours without heating and the product which formed was recovered on the filter by filtration. The yellow dye obtained on the filter was washed well with cold water and then dried. 220 parts (81% of theory) of 4-(di-β-hydroxyethylamino)-2-methylbenzylidenemalononitrile having the formula:

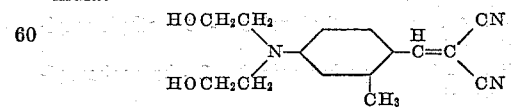

were obtained. It melts at 138° C.–140° C.

*Example 34*

By the use of 140 parts of ethylcyanoacetate in place of methylcyanoacetate in Example 30, a good yield of 4-(di - β - hydroxyethylamino) - 2 - methylbenzylideneethylcyanoacetate having the formula:

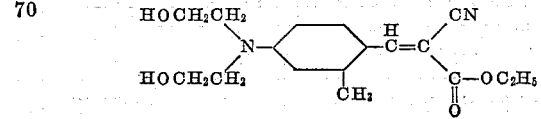

is obtained.

Example 35

By the use of 180 parts of n-butylcyanoacetate in place of methylcyanoacetate in Example 31, a good yield of 4-(di-β-hydroxyethylamino)benzylidene-n-butyl-cyanoacetate is obtained.

Example 36

By the use of 185 parts of β-methoxyethylcyanoacetate in place of methylcyanoacetate in Example 31, a good yield of 4-(di-β-hydroxyethylamino)benzylidene-β-methoxyethylcyanoacetate having the formula:

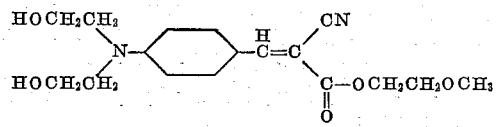

is obtained.

The methine compounds set forth in the tabulation given hereinafter are likewise readily prepared in accordance with the improved procedure described hereinbefore.

37. 4-dimethylamino-2-methylbenzylidenemethylcyanoacetate
38. 4-diethylaminobenzylidenemethylcyanoacetate
39. 4-(di-β-methoxyethylamino)-2-methylbenzylidenemethylcyanoacetate
40. 4-(di-β-ethoxyethylamino)benzylidenemethylcyanoacetate
41. 4-(di-β-hydroxyethylamino)-2-chlorobenzylidenemethylcyanoacetate
42. 4-(n-butyl, β-hydroxyethyl)aminobenzylidenemethylcyanoacetate
43. 4-methylaminobenzylidenemethylcyanoacetate
44. 4-ethylamino-2-methylbenzylidenemethylcyanoacetate
45. 4-n-butylaminobenzylidenemethylcyanoacetate
46. 4-(di-β-hydroxyethylamino)-2-chlorobenzylideneethylcyanoacetate
47. 4-(ethyl, β-hydroxyethyl)aminobenzylidene-n-propylcyanoacetate
48. 4-(ethyl, β-hydroxyethyl)aminobenzylidene-n-butylcyanoacetate
49. 4-(di-β-hydroxyethylamino)-2-methylbenzylidene-β-ethoxyethylcyanoacetate
50. 4-(di-β-hydroxyethylamino)-2-chlorobenzylidenemalononitrile
51. 4-(ethyl, β-hydroxyethyl)aminobenzylidenemalononitrile
52. 4-(n-butyl, β-hydroxyethyl)aminobenzylidenemalononitrile
53. 4-dimethylaminobenzylidenemalononitrile
54. 4-(di-β-hydroxyethylamino)-2-methoxybenzylidenemalononitrile
55. 4-(di-β-hydroxyethylamino)-2-ethoxybenzylidenemalononitrile
56. 4-(di-β-hydroxyethylamino)-2-ethylbenzylidenemalononitrile
57. 4-(di-β-hydroxyethylamino)-2-bromobenzylidenemalononitrile
58. 4-(di-β-methoxyethylamino)benzylidenemalononitrile Any of the unacylated methine dye compounds disclosed in U. S. Patents 2,583,551 and 2,583,614 can be prepared using the improved procedure described herein. The methine compounds containing a hydroxyalkyl group can be acylated in accordance with the procedure described in U. S. Patents 2,583,551 and 2,583,614 to obtain acylated methine dye compounds.

So far as we are aware, the new and improved processes described herein for the preparation of the benzalaniline-3-sulfonic acid compounds and the methine compounds are operable regardless of the size of the alkyl, hydroxyalkyl or alkoxyalkyl group involved. However, those compounds wherein the alkyl group contains one to four, inclusive, carbon atoms, the hydroxyalkyl group contains two to four, inclusive, carbon atoms and the alkoxyalkyl group contains three to four, inclusive, carbon atoms appear to be the most practical and useful and, accordingly, our invention is especially directed to such benzalaniline-3-sulfonic acid and methine compounds. Illustrative alkyl, hydroxyalkyl and alkoxyalkyl groups have been specifically disclosed in connection with the members R and R₁.

The methine compounds described herein are valuable dyes for cellulose acetate textile materials. They may be advantageously directly applied to the cellulose acetate textile material undergoing coloration in the form of an aqueous suspension which can be prepared by grinding the dye to a paste in the presence of a sulfonated oil, soap, sodium lignin sulfonate or other suitable dispersing agent and dispersing the resulting paste in water.

Direct dyeing operations can with advantage be conducted at temperatures of about 70° C.–90° C. but any suitable temperature can be used. Thus, the cellulose acetate textile material to be dyed or colored is ordinarily added to the dye bath at a temperature lower than that at which the main portion of the dyeing is to be effected, a temperature approximating 45° C.–55° C., for example, following which the temperature is raised to that selected for carrying out the dyeing operation. The temperature at which the dyeing is conducted may, of course, be varied somewhat depending upon the particular cellulose acetate textile material undergoing coloration and the particular amount of coloration desired. As understood by those skilled in the dyeing art, the intensity of dyeing can be varied by varying the proportion of dye to material undergoing coloration. The amount of dye used can be, for example, ⅓% to 3% (by weight) of that of the cellulose acetate textile material although lesser or greater amounts of dye can be used.

We claim:

1. The process for preparing benzalaniline-3-sulfonic acid compounds which in their free acid form have the formula:

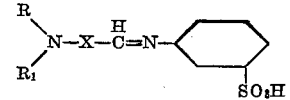

wherein X stands for a monocyclic aryl nucleus of the benzene series and R and R₁ each represents a member selected from the group consisting of an alkyl group, a hydroxyalkyl group and an alkoxyalkyl group and wherein the group

stands in para position to the

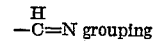

which comprises reacting an aniline compound having the para position to the amino group free and having the formula

wherein R, R₁ and X have the meaning previously assigned to them, with formaldehyde and meta-nitrobenzene sulfonic acid in the presence of sulfuric acid and iron at a temperature of from 5° C. to 35° C.

2. The process for preparing benzalaniline-3-sulfonic acid compounds which in their free acid form have the formula:

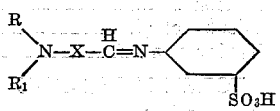

wherein X stands for a monocyclic aryl nucleus of the benzene series and R and $R_1$ each represents a member selected from the group consisting of an alkyl group, a hydroxyalkyl group and an alkoxyalkyl group and wherein the group

stands in para position to the

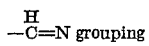

which comprises reacting an aniline compound having the para position to the amino group free and having the formula

wherein R, $R_1$ and X have the meaning previously assigned to them, with formaldehyde and meta-nitrobenzene sulfonic acid in the presence of sulfuric acid and iron at a temperature of from about 16° C. to about 20° C.

3. The process for preparing benzalaniline-3-sulfonic acid compounds which in their free acid form have the formula:

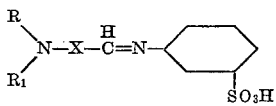

wherein X stands for a monocyclic aryl nucleus of the benzene series and R and $R_1$ each represents a member selected from the group consisting of an alkyl group, a hydroxyalkyl group and an alkoxyalkyl group and wherein the group

stands in para position to the

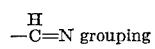

which comprises forming metanitrobenzene sulfonic acid by reacting nitrobenzene with an excess of sulfuric acid over that theoretically required to form meta-nitrobenzene sulfonic acid and reacting the meta-nitrobenzene sulfonic acid thus formed without isolation from its reaction mixture with formaldehyde and an aniline compound having the para position to the amino group free and having the formula

wherein R, $R_1$ and X have the meaning previously assigned to them, in the presence of iron at a temperature of from 5° C. to 35° C.

4. The process for preparing benzalaniline-3-sulfonic acid compounds which in their free acid form have the formula:

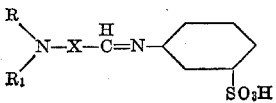

wherein X stands for a monocyclic aryl nucleus of the benzene series and R and $R_1$ each represents a member selected from the group consisting of an alkyl group, a hydroxyalkyl group and an alkoxyalkyl group and wherein the group

stands in para position to the

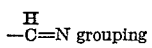

which comprises forming metanitrobenzene sulfonic acid by reacting nitrobenzene with an excess of sulfuric acid over that theoretically required to form meta-nitrobenzene sulfonic acid and reacting the meta-nitrobenzene sulfonic acid thus formed without isolation from its reaction mixture with formaldehyde and an aniline compound having the para position to the amino group free and having the formula

wherein R, $R_1$ and X have the meaning previously assigned to them, in the presence of iron at a temperature of from about 16° C. to about 20° C.

5. The process for preparing 4'-(di-β-hydroxyethylamino)-2'-methylbenzalaniline-3-sulfonic acid which comprises reacting N,N-di-β-hydroxyethyl-m-toluidine with formaldehyde and meta-nitrobenzene sulfonic acid in the presence of sulfuric acid and iron at a temperature of from 5° C. to 35° C.

6. The process for preparing 4'-(di-β-hydroxyethylamino)-2'-methylbenzalaniline-3-sulfonic acid which comprises reacting N,N-di-β-hydroxyethyl-m-toluidine with formaldehyde and meta-nitrobenzene sulfonic acid in the presence of sulfuric acid and iron at a temperature of from about 16° C. to about 20° C.

7. The process for preparing 4'-(di-β-hydroxyethylamino)-2'-methylbenzalaniline-3-sulfonic acid which comprises forming meta-nitrobenzene sulfonic acid by reacting nitrobenzene with an excess of sulfuric acid over that theoretically required to form meta-nitrobenzene sulfonic acid and reacting the meta-nitrobenzene sulfonic acid thus formed without isolation from its reaction mixture with formaldehyde and N,N-di-β-hydroxyethyl-m-toluidine in the presence of iron at a temperature of from 5° C. to 35° C.

8. The process for preparing 4'-(di-β-hydroxyethylamino)-2'-methylbenzalaniline-3-sulfonic acid which comprises forming meta-nitrobenzene sulfonic acid by reacting nitrobenzene with an excess of sulfuric acid over that theoretically required to form meta-nitrobenzene sulfonic acid and reacting the meta-nitrobenzene sulfonic acid thus formed without isolation from its reaction mixture with formaldehyde and N,N-di-β-hydroxyethyl-m-toluidine in the presence of iron at a temperature of from about 16° C. to about 20° C.

9. The process for preparing 4'-(di-β-hydroxyethylamino)benzalaniline-3-sulfonic acid which comprises reacting N,N-di-β-hydroxyethylaniline with formaldehyde and meta-nitrobenzene sulfonic acid in the presence of sulfuric acid and iron at a temperature of from 5° C. to 35° C.

10. The process for preparing 4'-(ethyl, β-hydroxyethyl)-aminobenzalaniline-3-sulfonic acid which comprises reacting N-ethyl-N-β-hydroxyethylaniline with formaldehyde and meta-nitrobenzene sulfonic acid in the presence of sulfuric acid and iron at a temperature of from 5° C. to 35° C.

11. The process for preparing 4'-(di-β-hydroxyethylamino)-2'-chlorobenzalaniline-3-sulfonic acid which comprises reacting N,N-di-β-hydroxyethyl-m-chloroaniline with formaldehyde and meta-nitrobenzene sulfonic acid in the presence of sulfuric acid and iron at a temperature of from 5° C. to 35° C.

12. The process for preparing 4'-(n-butyl, β-hydroxyethyl)amino-2'-methylbenzalaniline-3-sulfonic acid which comprises reacting N-n-butyl-N-β-hydroxyethyl-m-toluidine with formaldehyde and meta-nitrobenzene sulfonic acid in the presence of sulfuric acid and iron at a temperature of from 5° C. to 35° C.

References Cited in the file of this patent

UNITED STATES PATENTS

| 2,048,006 | Hutton | July 21, 1936 |
| 2,583,551 | Dickey et al. | Jan. 29, 1952 |
| 2,583,614 | Taylor et al. | Jan. 29, 1952 |

FOREIGN PATENTS

| 586,127 | Great Britain | Mar. 7, 1947 |